United States Patent
Lazenby, Jr. et al.

(10) Patent No.: US 6,700,576 B1
(45) Date of Patent: Mar. 2, 2004

(54) VARIABLE STRIDE CIRCLE RENDERING APPARATUS AND METHOD

(75) Inventors: William R. Lazenby, Jr., Madison, AL (US); Dale Kirkland, Madison, AL (US); Steven J. Heinrich, Huntsville, AL (US)

(73) Assignee: 3Dlabs, Inc., Ltd., Hamilton (BE)

( * ) Notice: Subject to any disclaimer, the term of this patent is extended or adjusted under 35 U.S.C. 154(b) by 0 days.

(21) Appl. No.: 09/535,358

(22) Filed: Mar. 24, 2000

Related U.S. Application Data (60) Provisional application No. 60/126,034, filed on Mar. 25, 1999.

(51) Int. Cl.$^7$ .............................................. G06T 11/20
(52) U.S. Cl. ..................................................... 345/441
(58) Field of Search .............................. 345/441, 442, 345/953, 964, 440, 428; 382/203; 708/275

(56) References Cited

U.S. PATENT DOCUMENTS

| | | | |
|---|---|---|---|
| 4,530,156 A | * 7/1985 | Kettlestrings | 33/27 |
| 4,591,843 A | 5/1986 | Pratt | |
| 4,692,887 A | * 9/1987 | Hashidate | 364/720 |
| 4,835,722 A | * 5/1989 | Clarke et al. | 364/720 |
| 5,237,649 A | * 8/1993 | Yamada | 395/142 |
| 5,874,968 A | * 2/1999 | Hama | 345/442 |
| 6,289,831 B1 | * 9/2001 | Hanai et al. | 112/102.5 |
| 6,600,485 B1 | * 7/2003 | Yoshida et al. | 345/419 |

OTHER PUBLICATIONS

Hobby; Rasterizing Curves of Constant Width; Apr. 1989, ACM vol. 36, No. 2, pp. 209–229.*

IBM Technical Disclosure; Optimized Drawing of Filled and Unfilled Circles in a Two–Dimensional Graphics System; Nov. 1990 NB9011291, pp. 291–295, vol. 33, issue 6B.*

Wright; Parallelization of Bresenham's Line and Circle Algorithms; IEEE, 0272–17–16/90/0900–0060, 1990, pp. 60–67.*

Aken et al., Curve–Drawing Algorithms for Raster Displays, 1985 ACM 0730–0301/85/0400–0147, Vol 4, No. 2, pp. 147–169.*

An Improved Parallel Circle Drawing ALgorithm, Huang and Banissi, 1997, IEEE.*

J.A. Harrison, "A powerful display driver for real time systems", International Conference on Displays for Man-Machine Syatem Apr. 1977, pp. 6–9.*

* cited by examiner

Primary Examiner—Mark Zimmerman
Assistant Examiner—Scott Wallace
(74) Attorney, Agent, or Firm—Arnall Golden Gregory LLP (57) ABSTRACT

An apparatus and method for rendering a circle with a radius on a display device comprises (a) providing a set of vertex points; (b) selecting a subset of vertex points from the set of vertex points based on the radius of the circle; (c) scaling each vertex point in the subset of vertex points to produce scaled vertex points; and, (d) connecting the scaled vertex points to approximate the circle. The subset of vertex points may be utilized to determine scaled vertex points for all four quadrants of the circle. The subset of vertex points may be selected by determining the number of vertex points required to render the circle with an error less than a predetermined error threshold. The subset of vertex points is then selected so that the number of members in the subset of vertex points is equivalent to the number of vertex points required to render the circle with an error less than the predetermined threshold. An apparatus and method for rendering a circle with a radius and four quadrants on a display device comprises (a) providing a set of vertex points for one quadrant of the circle; (b) identifying the vertex points for the remaining three quadrant using the set of vertex points; and (c) connecting the vertex points to approximate the circle.

33 Claims, 7 Drawing Sheets

Accuracy and error calculation

VARIABLE STRIDE CIRCLE RENDERING APPARATUS AND METHOD

PRIORITY

This application claims priority from U.S. provisional patent application serial No. 60/126,034, filed Mar. 25, 1999, entitled "VARIABLE STRIDE CIRCLE RENDERING APPARATUS AND METHOD" the disclosure of which is incorporated herein, in its entirety, by reference.

FIELD OF THE INVENTION

The invention generally relates to computer systems and, more particularly, the invention relates to the rendering of a circle by approximating the circle using the vertices of a polygon.

BACKGROUND OF THE INVENTION

Figure 1:
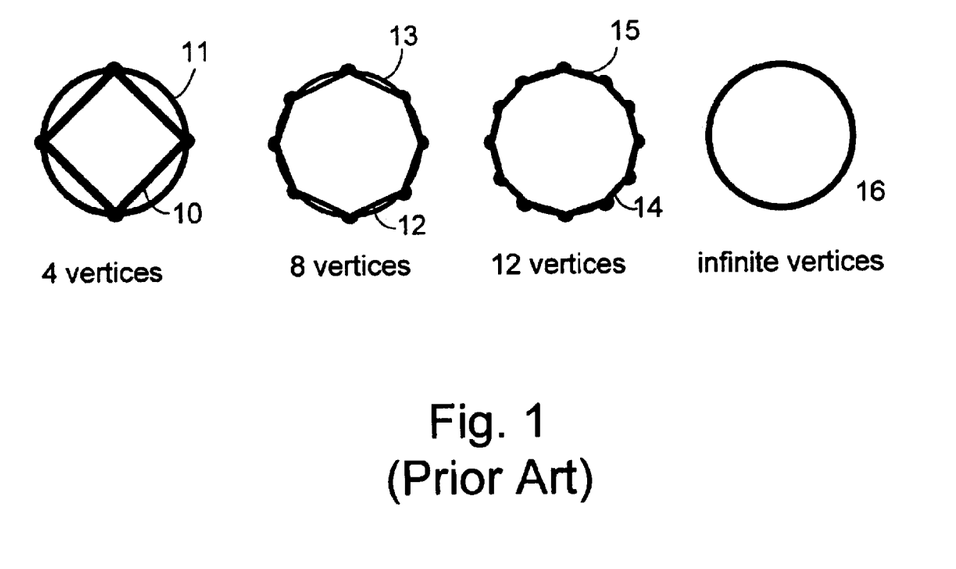
FIG. 1 illustrates polygons of various vertex counts approximating a rendered circle.

Some computer graphics systems have hardware dedicated to rendering circles precisely using differentials. Alternatively, computer graphics systems that do not have dedicated hardware for rendering circles typically improve performance by approximating circles using a polygon whose vertices lie along the circumference of the circle. The approximation of a circle by using a polygon with multiple vertices is shown in FIG. 1. A four sided polygon 10 may be used to approximate circle 11. Also shown are an eight sided polygon 12, a twelve sided polygon 14 and a circle 16 approximated by using an infinite number of vertices. The number of vertices required to render a circle is dependent upon the desired accuracy and the radius of the circle itself. The number of vertices is also directly related to the amount of time it takes to render the circle, and therefore, inversely proportional to the performance of the computer graphics system.

In a computer graphics system which approximates a circle using a polygon, typically, sine and cosine functions are used to compute each vertex of the polygon used to approximate the circle. Alternatively, a table of precomputed sine and cosine coordinate values may be used to eliminate the sine and cosine computations on a per-vertex basis. The size of the table of sine and cosine values will determine the number of vertices which are used to approximate a circle. For example, if the computer graphics system has a table with six entries, six vertices will be used to approximate the circle. Since a large number of vertices is required to represent a large circle, then, a large table of sine and cosine values must be created. This same table when used to render a smaller circle, however, will be far more accurate than necessary, and will result in slower performance of the computer graphics system.

SUMMARY OF THE INVENTION

In accordance with one aspect of the invention, an apparatus and method for rendering a circle on a display device, the circle having a radius and a circumference, (a) provides a set of vertex points, (b) selects a subset of vertex points from the set of vertex points based on the radius of the circle, (c) scales each vertex point in the subset of vertex points to produce scaled vertex points, and then (d) connects each scaled vertex point in the subset of vertex points to approximate the circle. In a preferred embodiment, the act of scaling comprises multiplying each vertex point by the radius of the circle. The set of vertex points may be stored in a table in a computer memory. In another embodiment, the subset of vertex points is used to determine scaled vertex points for all four quadrants of the circle. In a further preferred embodiment, the members of the subset of vertex points are evenly distributed about the circumference of the circle.

In one embodiment, the aforementioned step (b) may further determine the number of vertex points required to render the circle with an error less than a predetermined error threshold and then select the subset of vertex points such that the number of members in the subset of vertex points is equivalent to the number of vertex points required to render the circle with an error less than the predetermined error threshold. The number of vertex points required to render the circle with an error less than the predetermined error threshold may be determined using the following relationship:

$$n = \frac{\pi}{4\cos^{-1}\left(\frac{r-\varepsilon}{r}\right)}$$

where n=number of vertex points; r=radius of the circle; and, ε=the predetermined error threshold.

In an alternative embodiment, the aforementioned step (b) may further identify all possible vertex point counts, determine the maximum circle radius which may be rendered using each of the possible vertex point counts such that an error is less than a predetermined error threshold and then select the subset of vertex points by comparing the radius of the circle to each maximum circle radius. The maximum circle radius may be determined using the following relationship:

$$r = \frac{\varepsilon}{1 - \cos\left(\frac{\pi}{4n}\right)}$$

where r=maximum circle radius; ε=the predetermined error threshold; and, n=vertex point count.

In accordance with another aspect of the invention, an apparatus and method for rendering a circle on a display device, the circle having a radius and four quadrants, (a) provides a set of vertex points for one quadrant of the circle, (b) identifies the vertex points for the remaining three quadrants using the set of vertex points, and (c) connects the vertex points of all four quadrants to approximate the circle. In a preferred embodiment, the apparatus and method further comprises multiplying each vertex point in each quadrant by the radius of the circle. The set of vertex points may be stored in a table in a computer memory. In another embodiment, step (b) may further select a subset of vertex points based on the radius of the circle and identify the vertex points for the remaining three quadrants using the members of the subset of vertex points.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

A computer graphics system may render a circle by approximating the circle using a polygon whose vertices lie along the circumference of the circle. A table of precomputed coordinate values may be used to generate the vertices necessary to render the circle. The number of vertices used to approximate the circle is related to the number of entries in the table of coordinate values. In preferred embodiments, variable numbers of the entries in the table of coordinate values may be used to render each circle drawn by the computer graphics system. For example, in a twelve entry table, only two entries may be used to approximate the circle. Details are discussed below.

In order to improve the performance of a computer graphics system, the number of entries of the coordinate table (i.e. the number of vertices) used to approximate a circle may be determined dynamically based upon the radius of the circle being rendered by the computer graphics system. A smaller number of vertices may be used as long as the error is less than a given error threshold. If below such error threshold, the error should not be noticeable to the human eye. In a preferred embodiment, the error threshold is one pixel. The number of vertices used to render each circle is determined using a "stride value". The stride value, as shown below, is a value that has an associated set of equally spaced vertices in the table. In a twelve entry table, for example, if the stride value is four, then the first, fifth and ninth entries may be used to render the circle. Alternatively, any other set of table entries evenly distributed may be used to render the circle (e.g. the second, sixth and tenth entries for a stride of four). In general, for a given stride value, any set of evenly distributed table entries may be used to render the circle. As shown below, the stride value preferably is selected based upon the radius of the circle being rendered by the computer graphics system.

In a preferred embodiment, the table of coordinate values includes sine and cosine values. The table of coordinate values preferably includes the coordinate values necessary to generate the vertices of only one quarter of a circle (i.e., a single quadrant). Each entry in the table of coordinate values has an X coordinate value and a Y coordinate value which are used to calculate an offset from the center of the circle being rendered. The X coordinate value is generated using the sine function and the Y coordinate value is generated using the cosine function. In a preferred embodiment, since the X and Y coordinate values of each quadrant of the circle will have identical magnitudes, data space is saved by storing only the X and Y coordinate values for a single quadrant in the table of coordinate values. In an alternative embodiment, the X and Y coordinate values for all four quadrants may be stored in the table of coordinate values.

Figure 2:
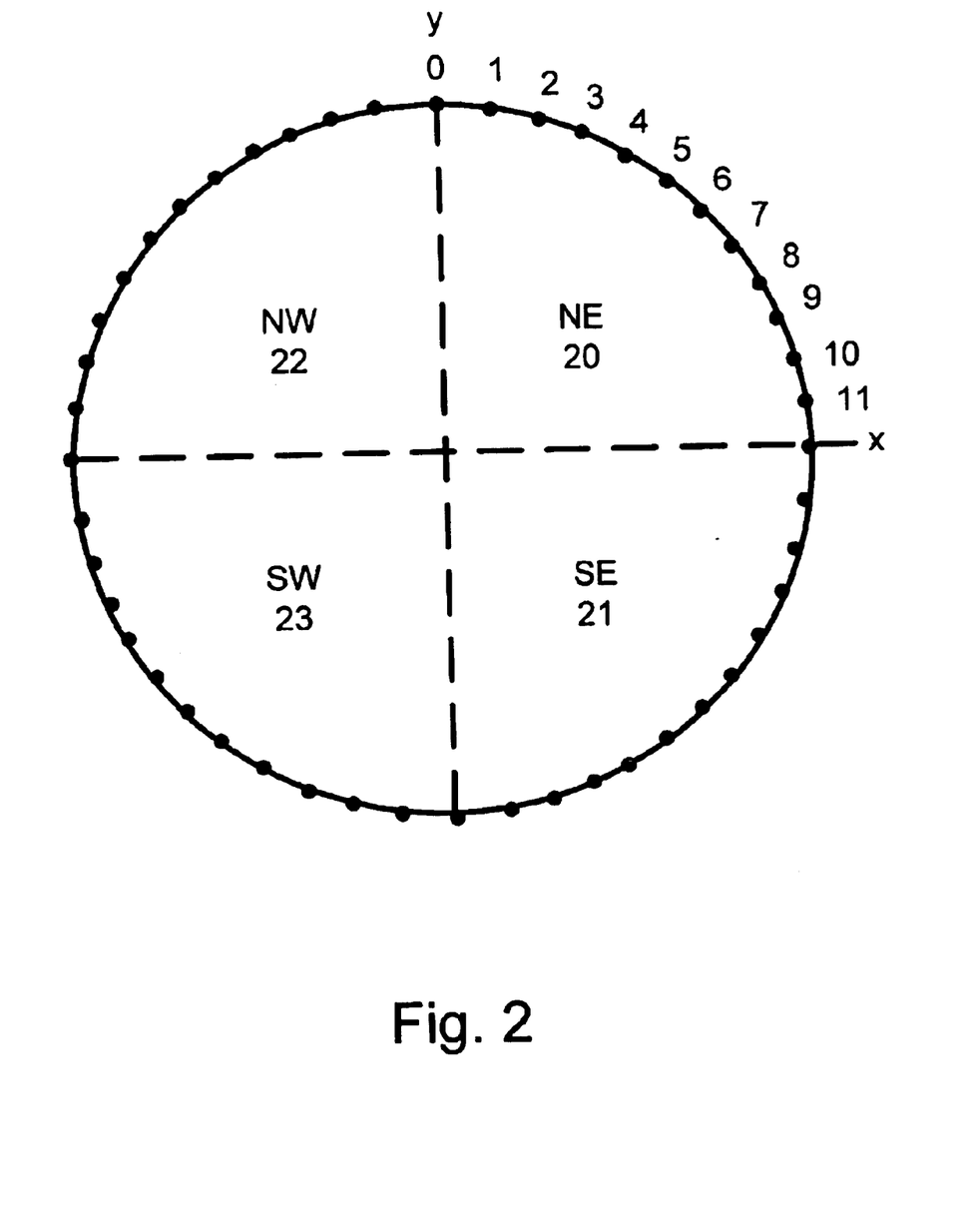
FIG. 2 is a schematic drawing of a circle approximated using a twelve entry table of function values.

The X and Y coordinate values may be generated using the following equations:

$$X_i = \sin\left(\frac{i}{t} \times \frac{\pi}{2}\right)$$

$$Y_i = \cos\left(\frac{i}{t} \times \frac{\pi}{2}\right)$$

Where t is the total number of entries (x,y coordinate pairs) in the table of coordinate values, and i is the entry number ranging from 0-(t-1). In a preferred embodiment, a table of coordinate values with twelve entries (t=12) is used to store the X and Y coordinate values for one quadrant of the circle. The vertex points should be evenly distributed around the circle. Accordingly, for a twelve entry table, a circle will have up to 48 vertex points around the entire circle (12 points per quadrant) as shown in FIG. 2. To generate vertex points in the northeast (NE) quadrant 20 (see FIG. 2) from the entries in the table of coordinate values, the X and Y coordinate values from each entry in the table of coordinate values are multiplied by the radius of the circle being drawn resulting in scaled X' coordinate values and scaled Y' coordinate values. The scaled X' coordinate values and scaled Y' coordinate values are then added to the x and y coordinates, respectively, of the center of the circle being rendered. Vertex points in the other quadrants, southeast (SE) 21, southwest (SW) 23, and northwest (NW) 22, may be determined by negating the X and/or Y coordinate values from the table accordingly. For example, to obtain the vertex points for the NW quadrant 22 the X coordinate values in the table of coordinate values are negated and then multiplied by the radius of the circle.

Alternatively, the vertex points may be generated in a clockwise direction around the entire circumference of the circle. In this situation, the values of the SE quadrant 21 and the NW 22 quadrant may be determined by either traversing the table of coordinate values backwards or by switching the X and Y coordinate values from each entry.

Figure 3:
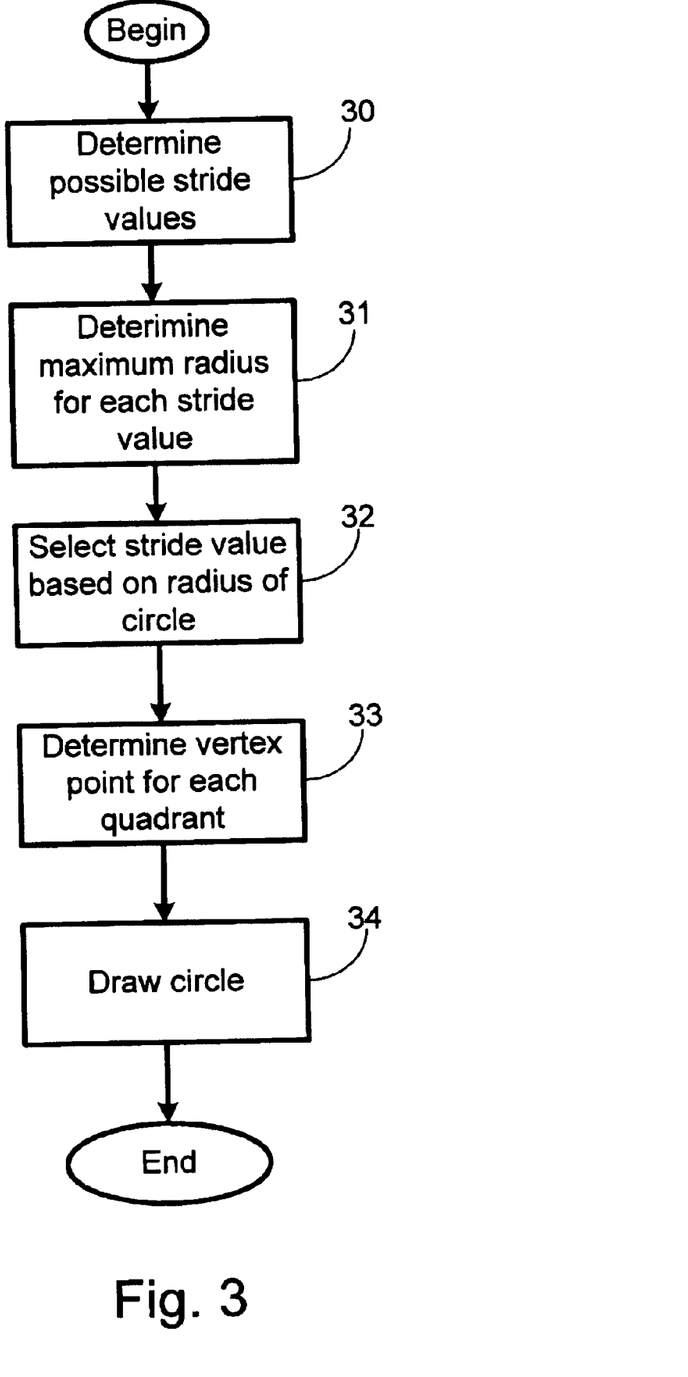
FIG. 3 is a block diagram of a method of rendering a circle in a computer graphics system in accordance with a preferred embodiment of the invention.

FIG. 3 is a block diagram of a method for rendering a circle in a computer graphics system in accordance with a preferred embodiment of the invention. A stride value, discussed above, is determined to dynamically vary the number of vertices used to approximate a circle based upon the radius of the circle. As shown below, the stride value determines which set of entries in the table is used to approximate the circle.

All possible stride values are determined in step 30. The stride used to walk through the table should be a value that is evenly divisible into the table size in order to distribute the points evenly around the circumference of the circle. Therefore, the size of the table of coordinate values (t) used by the computer graphics system is chosen so it is divisible by as many numbers as possible. In a preferred embodiment, a twelve entry table (t=12) of coordinate values is used in the computer graphics system. A twelve entry table will provide six possible stride values (i.e., 1, 2, 3, 4, 6 and 12). Each of the six possible stride values has a corresponding vertex count (i.e. the number of vertices) in each quadrant. The twelve entry table, thus, will have six possible vertex counts in each quadrant (i.e., 1, 2, 3, 4, 6 and 12). For example, for a stride value of four, the vertex count will be three. In other words, for a stride value of four, there will be three vertex points per quadrant. In a preferred embodiment, the first, fifth and ninth entries in the table of coordinate values would be used to determine the three vertex points in each quadrant.

Once the possible stride values are determined in step 30, it must be determined which stride value is appropriate to render a circle of radius r. Therefore, the maximum circle radius r corresponding to each possible stride value is determined in step 31. As discussed above, a smaller number of vertices may be used to approximate a circle as long as the error is less than a give error threshold. Accordingly, in a preferred embodiment, the stride value used to render a circle of radius r must be chosen so that the distance between the rendered edge and the actual circle is less than one pixel. This distance is referred to herein as the "error." Referring to FIG. 4, for example, the distance between the rendered edge 45 and the actual circle 46, therefore, is the error ($\epsilon$) 42. The maximum radius r corresponding to each stride value is determined using the error ($\epsilon$) 42 and the number of vertex points per quadrant, n, corresponding to the stride value. The stride value is determined as follows.

Figure 4:
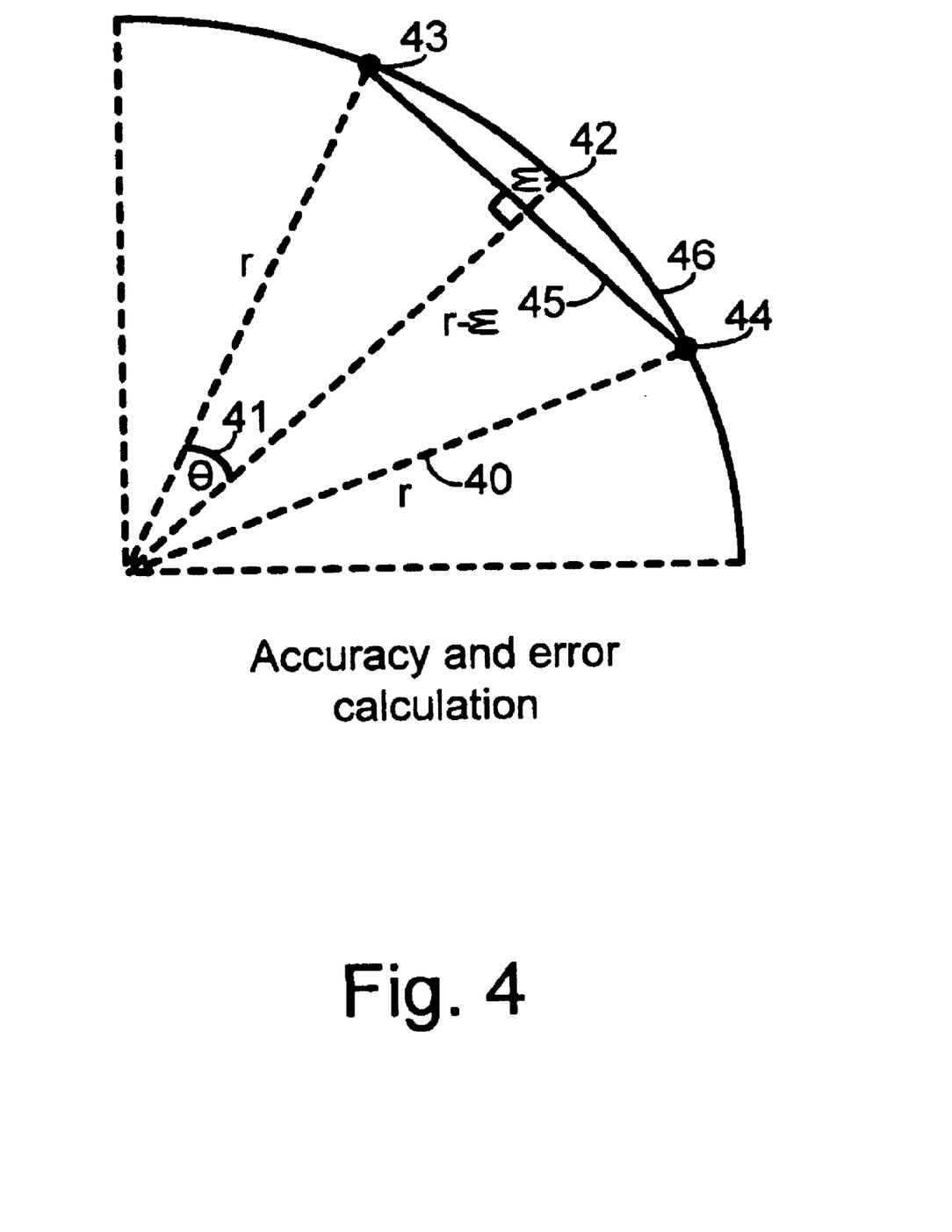
FIG. 4 illustrates the error used to calculate the number of vertices necessary to render an accurate representation of a circle in accordance with an embodiment of the invention.

Given a circle of radius (r) 40, the half angle ($\theta$) 41 between two points. 43 and 44, on the circle is calculated as:

$$\theta = \cos^{-1}\left(\frac{r-\varepsilon}{r}\right)$$

The number of vertex points, n, per quadrant required to maintain an error of less than a given error $\epsilon$ is therefore equivalent to the angle of the quadrant ($2\pi/4$) divided by the angle between two consecutive points on the circle ($2\theta$).

Therefore, the number of vertex points (n) is calculated as:

$$n = \frac{\pi}{4\theta} = \frac{\pi}{4\cos^{-1}\left(\frac{r-\varepsilon}{r}\right)}$$

This equation is then solved for the radius, r.

$$r = \frac{\varepsilon}{1 - \cos\left(\frac{\pi}{4n}\right)}$$

This equation, therefore, may be used to determine the maximum radius that can be rendered with the specified accuracy for any given stride value or corresponding number of vertex points. In a preferred embodiment, the error ($\epsilon$) must be less than one pixel. The maximum radius values may be stored in a table, such as Table 1. In accordance with a preferred embodiment, Table 1, below, shows the number of vertex points per quadrant and maximum radius corresponding to each possible stride value for a twelve entry table of coordinate values. The maximum radius is determined using the above described equation for the radius r. For example, for a stride value of four, three vertex points are used per quadrant. Using the above equation, a stride value of four may be used to render a circle with a radius less than 29.35, as show in Table 1. It is important to note that the radius must be less than the specified maximum to ensure an error less than one pixel ($\epsilon$<1).

TABLE 1

Maximum radius or each stride value for a system using a twelve entry table of coordinate values

| Stride | Vertex Count per Quadrant | Maximum Radius |
| --- | --- | --- |
| 1 | 12 | 467.06 |
| 2 | 6 | 116.89 |
| 3 | 4 | 52.04 |
| 4 | 3 | 29.35 |
| 6 | 2 | 13.14 |
| 12 | 1 | 3.41 |

In order to support circles with larger radius, a larger table of coordinate values must be used, such as a twenty-four (t=24) entry table of coordinate values. In an alternate embodiment, a twenty-four entry table of coordinate values would support a circle with a radius up to 1867.72.

FIG. 3, in step 32, a stride value is selected based upon the radius of the circle to be rendered by the computer graphics system. For example, using Table 1, a circle with a radius less than 3.14 may be rendered using a stride value of six. This will result in a set of two vertex points per quadrant. In other words, only two entries from the table of coordinate values will be used. In a preferred embodiment, the first and the seventh entries from the table would be used to determine the vertex points. Other sets with a stride of two may include the second and eighth vertices, the third and ninth vertices, the fourth and tenth vertices, the fifth and eleventh vertices, and the sixth and twelfth vertices. Of course, only one set of vertices for a given stride value is selected to render the circle.

Once the stride value has been selected in step 32, the vertex points are determined for each quadrant in step 33. As discussed above with respect to FIG. 2, a vertex point is determined by multiplying the X coordinate value and the Y coordinate value from the entry in the table of coordinate values by the radius of the circle resulting in a scaled X' coordinate value and a scaled Y' coordinate value. The scaled X' coordinate value and the scaled Y' coordinate value are then added to the X and Y coordinates, respectively, of the center of the circle being rendered. For example, using table 1, a stride value of six would be chosen for a circle with a radius less than 13.14. Therefore, in a preferred embodiment, the first and the seventh entries from the table of coordinate values are selected. The X and Y coordinate values of these entries are multiplied by the radius of the circle and then added to the X and Y coordinates of the center of the circle. The vertex points for the other quadrants of the circle may be determined as described above with respect to FIG. 2. In step 34, the circle is drawn using the vertex points as determined in step 33. Steps 32–34 are repeated for each circle of radius r to be rendered by the system.

Figure 5:
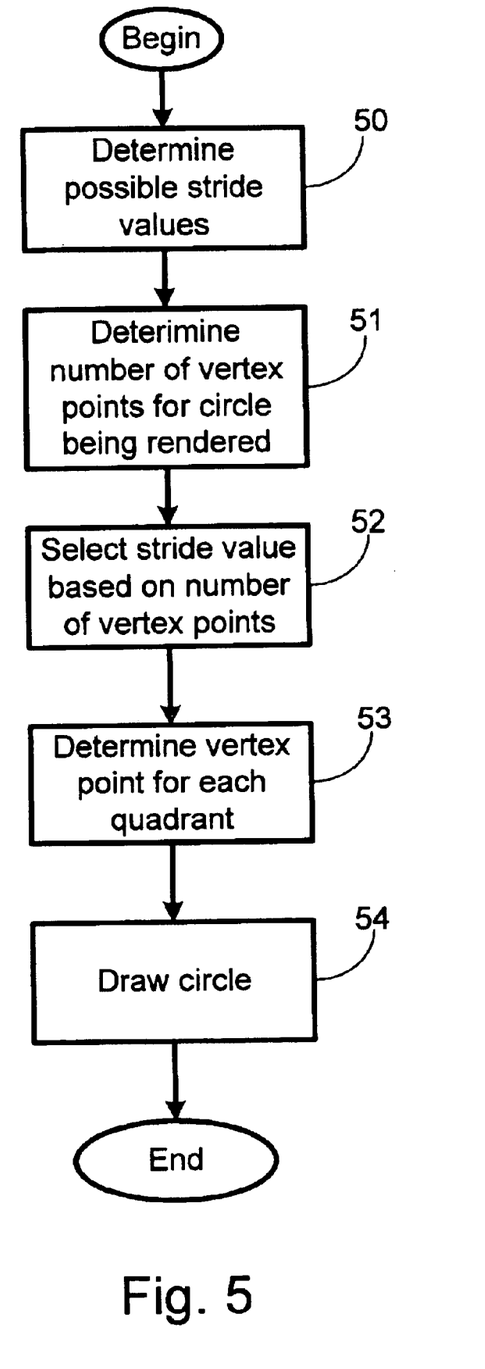
FIG. 5 is a block diagram of a method of rendering a circle in a computer graphics system according to an alternative embodiment of the invention.

FIG. 5 is a block diagram of an alternate method of rendering a circle in a manner similar to that described above. In step 50, all possible stride values and the corresponding vertex counts are determined as described above with respect to step 30 in FIG. 3. As discussed previously, a circle may be approximated using a smaller number of vertex points as long as the error, $\epsilon$, is less than a given error threshold. In a preferred embodiment, the error, $\epsilon$, is one pixel. In step 51 the number of vertex points, n, per quadrant required to maintain an error less than a given $\epsilon$ for the circle being rendered is calculated using the radius, r, of the circle to be rendered. As discussed previously, the number of vertex points, n, may be determined using the following equation:

$$n = \frac{\pi}{4\cos^{-1}\left(\frac{r-\varepsilon}{r}\right)}$$

Once the number of vertex points, n, for the circle being rendered has been calculated in step 51, the appropriate stride value may be selected in step 52 based on the number of vertex points, n. As mentioned above, each possible stride value, as determined in step 50, has a corresponding vertex count (i.e. number of vertex points per quadrant). Therefore, the stride value that corresponds with the number of vertex points calculated in step 51 is selected as the stride value to be used in rendering the circle.

Once the stride value has been selected in step 52, the vertex points are determined for each quadrant in step 53. The vertex points are determined as described above with respect to FIG. 2 and FIG. 3, step 33. In step 54, the circle is drawn using the vertex points as determined in step 53.

Figure 6:
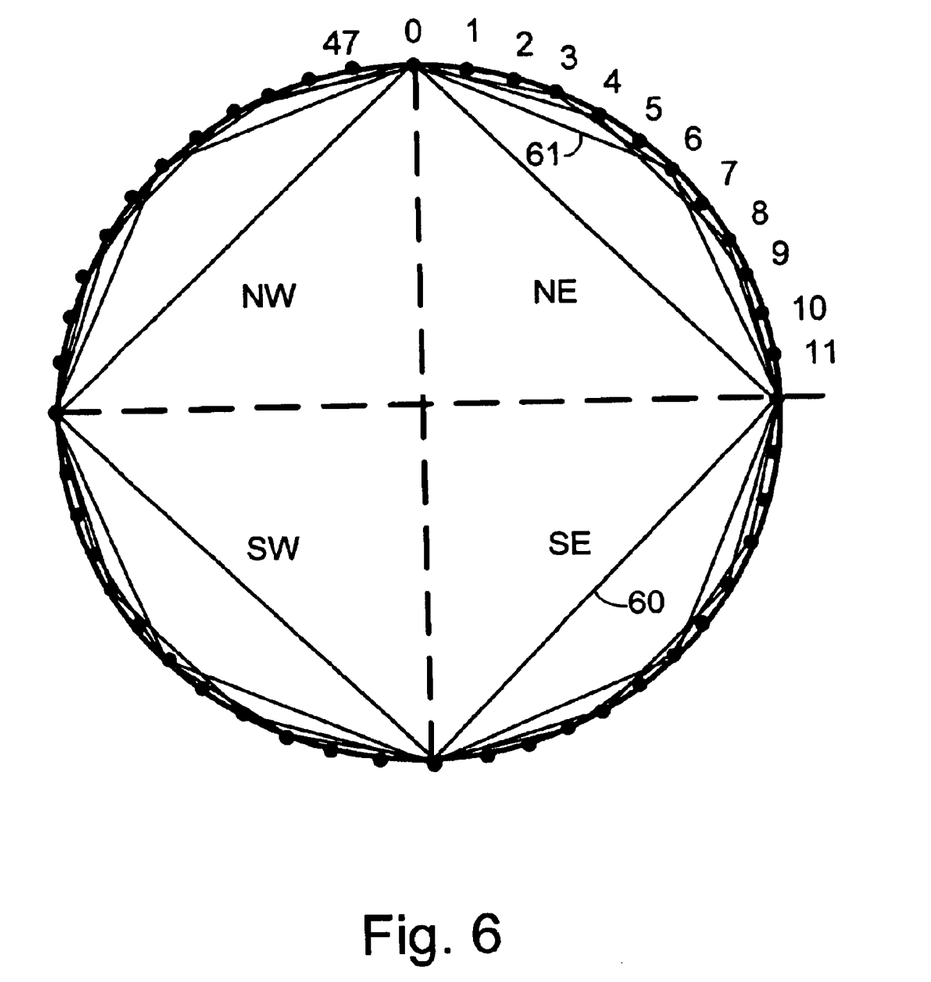
FIG. 6 is a schematic drawing of a preferred 48 vertex polygon approximation and the various smaller approximations that can be derived from it in accordance with an embodiment of the invention.

FIG. 6 shows the a circle approximated using the preferred twelve entry table of coordinate values which can result in as many as twelve vertex points per quadrant. Using a twelve entry table of coordinate values, the maximum number of vertex points which may be used to render the entire circle is forty-eight, as shown in FIG. 6. FIG. 6 also shows the various smaller sets of vertex points which may be used to approximate the circle based upon the stride value selected. For example, polygon 60 corresponds to a stride value of twelve, which results in one vertex point per quadrant. Alternatively, polygon 61 corresponds to a stride value of six, which results in two vertex points per quadrant.

Figure 7:
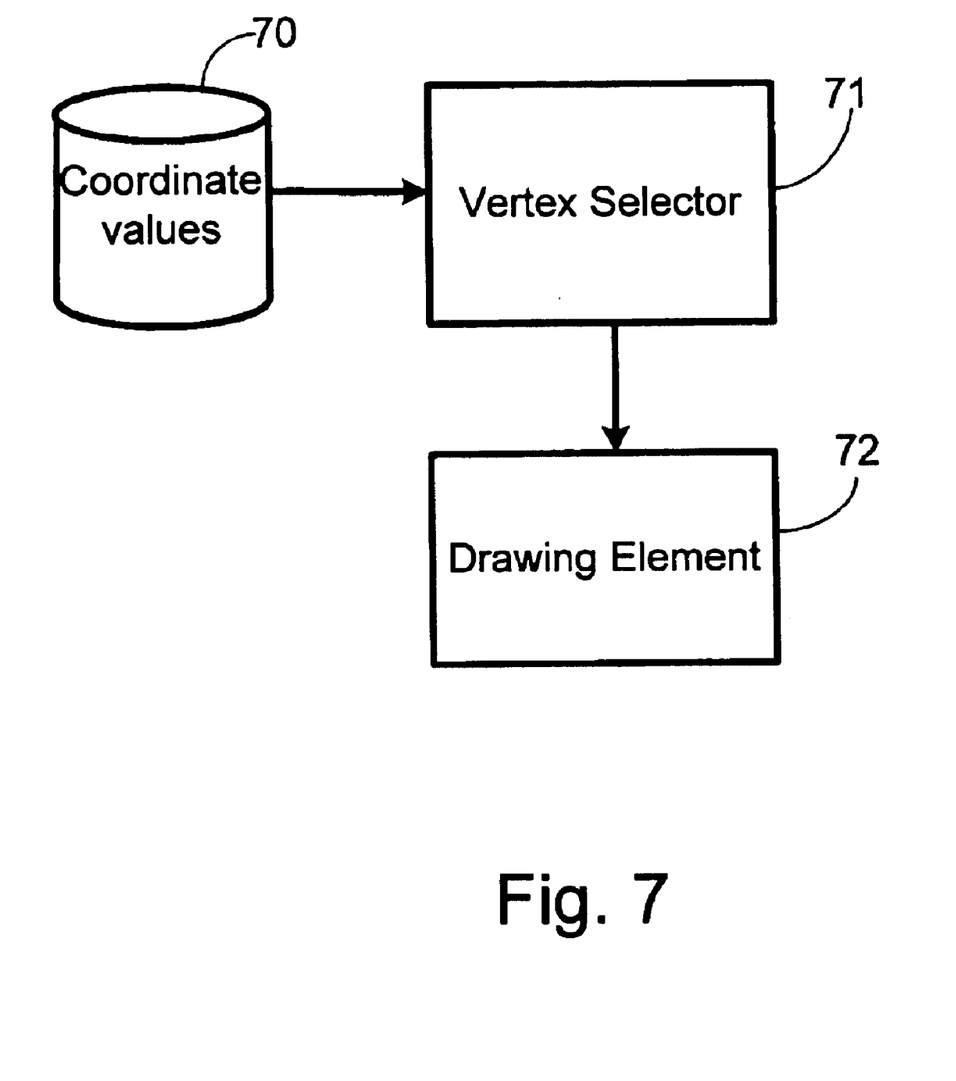
FIG. 7 is a block diagram of a device for rendering a circle in accordance with a preferred embodiment of the invention.

FIG. 7 is a block diagram of a device for rendering a circle in accordance with a preferred embodiment of the invention. A database of coordinate values 70 stores entries of X and Y coordinate values. In a preferred embodiment, the coordinate values are sine and cosine values. The X coordinate value is generated using the sine function and the Y coordinate value is generated using the cosine function. The formulas used to generate the X and Y coordinate values in accordance with a preferred embodiment are discussed above.

A vertex selector 71 is in data communication with the database of coordinate values and is used to select the vertex points to be used to render the circle. As discussed above with respect to FIG. 3, a stride value is used to determine the number of vertex points which will be used to approximate the circle. The set of stride values is determined based on the number of entries (t) in the database of coordinate values 70. The possible stride values should be evenly divisible into the total number of entries in the database of coordinate values 70. The vertex selector 71 chooses the stride value based upon the radius of the circle being rendered. As discussed above with respect to FIG. 3, each stride value has a maximum radius for which the stride value will accurately render a circle. A stride value may be used to render a circle with a radius less than its corresponding maximum radius. Alternatively, as discussed with respect to FIG. 5, the stride value may be selected by determining the number of vertex points required to maintain an error less than a given $\varepsilon$ using the radius of the circle being rendered.

Once the stride value has been selected, the vertex selector 71 selects entries from the database of coordinate values 70 based on the selected stride value. As discussed above with respect to FIG. 3, for a twelve entry database, there are six possible stride values (1,2,3,4,6 and 12). If a stride value of six is selected, then there will be two vertex points per quadrant. In a preferred embodiment, the vertex selector 71 will select the first and seventh entries from the database of coordinate values 70 and use these entries to determine the vertex points used to approximate the circle. A vertex point is determined by multiplying the X and Y coordinate values from an entry in the database of coordinate values to get a scaled X' coordinate value and a scaled Y' coordinate value. The scaled X' coordinate value and the scaled Y' coordinate value are then added to the X and Y coordinates, respectively, for the center of the circle. The drawing element 72 approximates the circle using the vertex points from the vertex selector 71.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components.

In an alternative embodiment, the disclosed method and device for rendering a circle may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As discussed previously, one of the advantages of preferred embodiments of the invention, is that the entire table of coordinate values is not used to render every circle. The number of entries from the table of coordinate values which are used may be determined dynamically based upon the radius of the circle being rendered. The performance of the computer graphics system thus is improved by using a smaller number of vertices to render smaller circles. The stride value is selected so that the circle is rendered with the desired accuracy.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of rendering a circle on a display device, the circle having a radius and a circumference, the method comprising:

(a) providing a set of vertex points;
    (b) selecting a subset of vertex points from the set of vertex points based on the radius of the circle, the subset of vertex points having fewer members than the set of vertex points;
    (c) scaling each vertex point in the subset of vertex points to produce scaled vertex points, wherein the act of scaling comprises multiplying each vertex point by the radius of the circle; and
    (d) connecting each scaled vertex point in the subset of vertex points to approximate the circle.

2. The method according to claim 1, wherein the set of vertex points is stored in a table in a computer memory.

3. The method according to claim 1, wherein the circle has four quadrants, the method further comprising (e) utilizing the subset of vertex points to determine scaled vertex points for all four quadrants.

4. The method according to claim 1, wherein the members of the subset of vertex points are evenly distributed about the circumference of the circle.

5. The method according to claim 1, wherein the act of selecting includes:

determining the number of vertex points required to render the circle with an error less than a predetermined error threshold; and selecting the subset of vertex points such that the number of members in the subset of vertex points is equivalent to the number of vertex points required to render the circle with an error less than the predetermined error threshold.

6. The method according to claim 5, wherein the number of vertex points required to render the circle with an error less than the predetermined error threshold is determined by the following relationship:

$$n = \frac{\pi}{4\cos^{-1}\left(\frac{r-\varepsilon}{r}\right)}$$

where:

n=number of vertex points;

r=radius of the circle; and $\varepsilon$=the predetermined error threshold.

7. The method according to claim 1, wherein the act of selecting includes:

identifying all possible vertex point counts;
    determining the maximum circle radius which may be rendered using each of the possible vertex point counts such that an error is less than a predetermined error threshold;
    selecting the subset of vertex points by comparing the radius of the circle to each maximum circle radius.

8. A The method according to claim 7, wherein each maximum circle radius is determined by the following relationship:

$$r = \frac{\varepsilon}{1 - \cos\left(\frac{\pi}{4n}\right)}$$

where:

r=maximum circle radius;

$\varepsilon$=the predetermined error threshold; and n=vertex point count.

9. An apparatus for rendering a circle on a display device, the circle having a radius and a circumference, the apparatus comprising:

a database of vertex points;

a vertex selector in data communication with the database of vertex points, the vertex selector for selecting a subset of vertex points from the set of vertex point based on the radius of the circle, wherein the vertex selector scales each vertex point in the subset of vertex points by multiplying each vertex point by the radius of the circle, the subset of vertex points having fewer members than the set of vertex points; and a drawing element coupled to the vertex selector, the drawing element connecting each vertex point in the subset of vertex points to approximate the circle.

10. The apparatus according to claim 9, wherein the set of vertex points are stored in a table in a computer memory.

11. The apparatus according to claim 9, wherein the members of the subset of vertex points are evenly distributed about the circumference of the circle.

12. The apparatus according to claim 9, wherein the subset of vertex points is selected by determining the number of vertex points required to render the circle with an error less than a predetermined error threshold.

13. The apparatus according to claim 12, wherein the number of members in the subset of vertex points is equivalent to the number of vertex points required to render the circle with an error less than the predetermined threshold.

14. The apparatus according to claim 12, wherein the number of vertex points required to render the circle with an error less than the predetermined error threshold is determined by the following relationship:

$$n = \frac{\pi}{4\cos^{-1}\left(\frac{r-\varepsilon}{r}\right)}$$

where:

n=number of vertex points;

r=radius of the circle; and $\varepsilon$=the predetermined error threshold.

15. The apparatus according to claim 9, wherein the subset of vertex points is selected by identifying all possible vertex point counts, determining the maximum circle radius which may be rendered using each of the possible vertex point counts such that an error is less than a predetermined error threshold and comparing the radius of the circle to each maximum circle radius.

16. The apparatus according to claim 15, wherein each maximum circle radius is determined by the following relationship:

$$r = \frac{\varepsilon}{1 - \cos\left(\frac{\pi}{4n}\right)}$$

where:

r=maximum circle radius;

ε=the predetermined error threshold; and n=vertex point count.

17. A computer program product for use on a computer system for rendering a circle on a display device, the circle having a radius, the computer program product comprising a computer usable medium having computer readable program code comprising:

program code for providing a set of vertex points;

program code for selecting a subset of vertex points from the set of vertex points based on the radius of the circle, the subset of vertex points having fewer members than the set of vertex points;

program code for scaling each vertex point in the set of vertex points to produce scaled vertex points, wherein the act of scaling comprises multiplying each vertex point by the radius of the circle; and program code for connecting each vertex point in the subset of vertex points to approximate the circle.

18. The computer program product as defined by claim 12, wherein the set of vertex points is stored in a table in a computer memory.

19. The computer program product as defined by claim 12, wherein the circle has four quadrants, the computer program product further comprising program code for utilizing the subset of vertex points to determine scaled vertex points for all four quadrants.

20. The computer program product as defined in claim 12, wherein the members of the subset of vertex points are evenly distributed about the circumference of the circle.

21. The computer program product as defined by claim 12, further including:

program code for determining the number of vertex points required to render the circle with an error less than a predetermined error threshold; and program code for selecting the subset of vertex points such that the number of members in the subset of vertex points is equivalent to the number of vertex points required to render the circle with an error less than the predetermined error threshold.

22. The computer program product as defined by claim 21, wherein the number of vertex points required to render the circle with an error less than the predetermined error threshold is determined by the following relationship:

$$n = \frac{\pi}{4\cos^{-1}\left(\frac{r-\varepsilon}{r}\right)}$$

where:

n=number of vertex points;

r=radius of the circle and

ε=the predetermined error threshold.

23. The computer program product as defined by claim 12, further including:

program code for identifying all possible vertex point counts;

program code for determining a maximum circle radius which can be rendered using each possible vertex point count such that an error is less than a predetermined error threshold; and program code for selecting the subset of vertex points by comparing the radius of the circle to each maximum circle radius.

24. The computer program product as defined by claim 23, wherein each maximum circle radius is determined by the following relationship:

$$r = \frac{\varepsilon}{1 - \cos\left(\frac{\pi}{4n}\right)}$$

where:

r=maximum circle radius;

n=vertex point count; and

ε=the predetermined error threshold.

25. A method for rendering a circle on a display device, the circle having a radius and four quadrants, the method comprising:

(a) providing a database of vertex points for one quadrant of the circle;

(b) identifying the vertex points for the remaining three quadrants using the database of vertex points;

(b1) multiplyiny each vertex point in each quadrant by the radius of the circle; and (c) connecting the vertex points of all four quadrants to approximate the circle.

26. The method according to claim 25, wherein the database of vertex points is stored as a table in a computer memory.

27. The method according to claim 25, wherein step (b) further includes:

selecting a subset of vertex points based on the radius of the circle; and identifying the vertex points for the remaining three quadrants using the members of the subset of vertex points.

28. An apparatus for rendering a circle on a display device, the circle having a radius and four quadrants, the apparatus comprising:

a database of vertex points for one quadrant of the circle;

a vertex identifier in data communication with the database of vertex points, the vertex identifier for identifying the vertex points in the remaining three quadrants using the set of vertex points, wherein the vertex identifier scales the vertex points in each quadrant by multiplying each vertex point in each quadrant by the radius of the circle; and a drawing element coupled to the vertex identifier, for connecting the vertex points of all four quadrants so as to approximate the circle.

29. The apparatus according to claim 28, wherein the set of vertex points is stored in a table in a computer memory.

30. The apparatus according to claim 28, wherein the vertex points in the remaining three quadrants are identified by selecting a subset of vertex points from the set of vertex points based on the radius of the circle and using the members of the subset of vertex points to determine the vertex points for each of the three remaining quadrants.

31. A computer program product for use on a computer system for rendering a circle on a display device, the circle having a radius and four quadrants, the computer program product comprising a computer usable medium having computer readable program code comprising:

program code for providing a database of vertex points for one quadrant of the circle;

program code for identifying the vertex points for the remaining three quadrants using the database of vertex points;

program code for scaling the vertex points in each of the four quadrants by multiplying each vertex point in each quadrant by the radius of the circle; and program code for connecting the vertex points of all four quadrants so as to approximate the circle.

32. The computer program product as defined in claim 31, wherein the database of vertex points is stored as a table in a computer memory.

33. The computer program product as defined in claim 31, further including:

program code for selecting a subset of vertex points based on the radius of the circle; and program code for identifying the vertex points for the remaining three quadrants using the members of the subset of vertex points.

* * * * *